June 12, 1945.   E. H. PIRON   2,378,097
COIL SPRING SUSPENSION
Filed March 9, 1942

INVENTOR.
Emil H. Piron
BY

Patented June 12, 1945

2,378,097

UNITED STATES PATENT OFFICE 2,378,097

COIL SPRING SUSPENSION

Emil H. Piron, New York, N. Y., assignor to Transit Research Corporation, New York, N. Y., a corporation of New York Application March 9, 1942, Serial No. 433,937

8 Claims. (Cl. 267—4)

This invention relates to springing systems particularly adaptable for vehicles, the example herein chosen being rail cars, and has for its object to provide an improved spring and combination of springs by which riding quality attainable from metallic coils may be increased.

It is common practice to employ pairs of coil springs in rail cars. For instance, it is common practice to place one spring in front of and another in rear of each journal bearing. Such springs have equal load deflection characteristics and are usually made very long and very unstable horizontally so that pedestals are required. The common practice is for the springs to have substantially constant load deflection ratio with the result that they give acceptable riding comfort under one loading or operating condition but depart progressively from that comfort with departure from that condition.

An important object of this invention is to provide a coil spring of substantially constant cross sectional diameter throughout its length having a variable load deflection ratio.

Another object is to provide a set of springs composed of one spring having a selected length and load deflection ratio such that it resists the major portion of the static loading by the car body and another spring of different load deflection characteristics which participates in all heavier loadings and which imparts a load deflection ratio to the two springs acting as a set which differs from that of either spring alone.

More specifically it is an object of this invention to provide a set of springs composed of one spring having a substantially constant load deflection ratio under vertical loading and another spring having an increasing load deflection ratio under vertical loading, the two springs together having an increasing load deflection ratio.

A further object is to provide a set of coil springs in which one member will have a substantially constant load deflection ratio under vertical loading and will be relatively unstable against lateral loading and in which another member will have an increasing load deflection ratio under vertical loading and will be quite stable against lateral loading so that the supported structure will be guided in all its movements solely by the springs.

Figure 1:
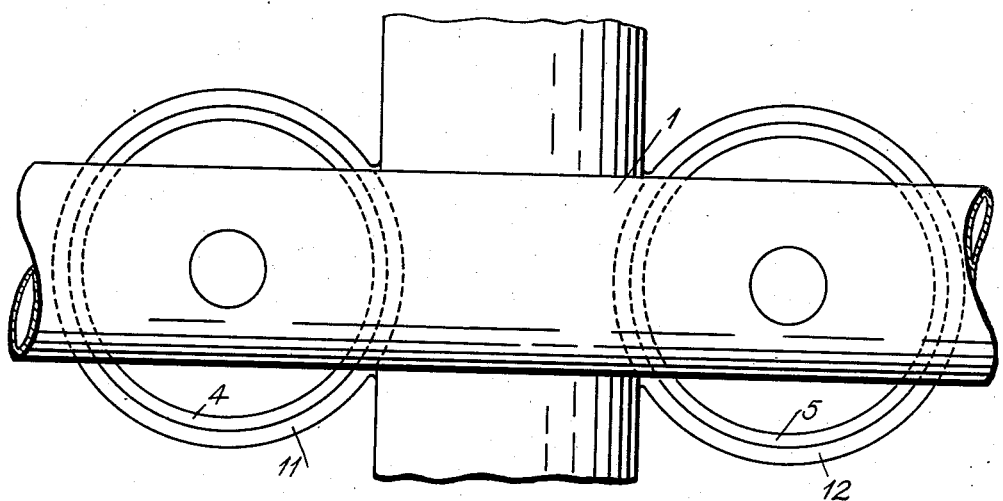
Figure 2:
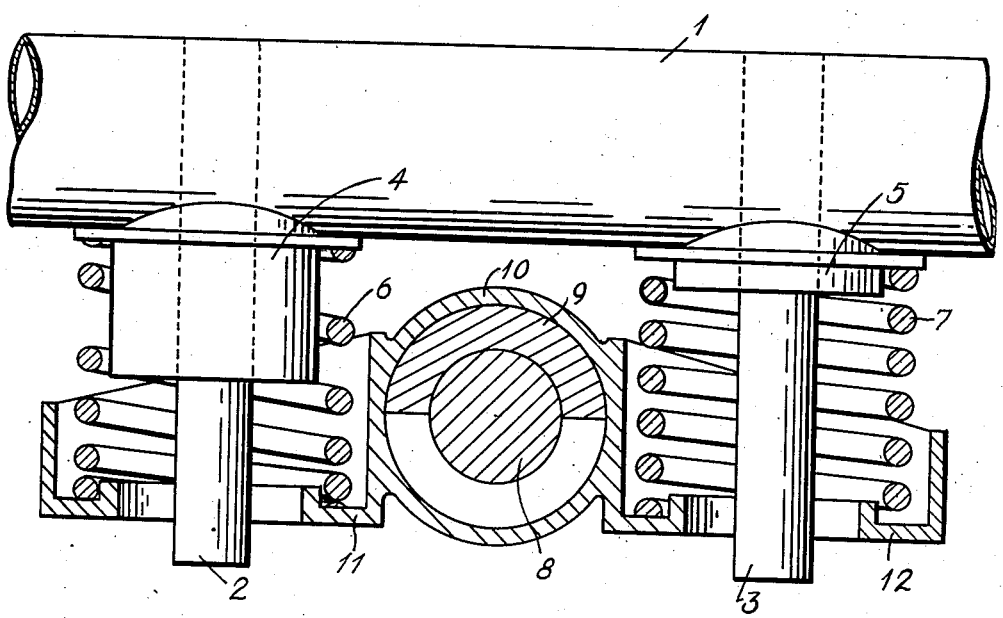
Figures 3, 4:
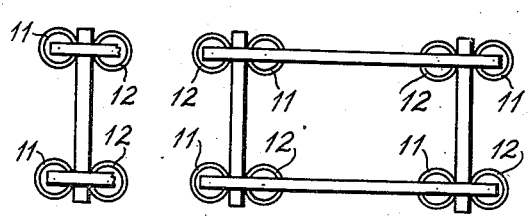

Other objects and advantages will hereinafter become more fully apparent as reference is had to the accompanying drawing in which Figure 1 is a plan view illustrating a fragment of a truck frame supported from an axle housing by my improved springing system, Figure 2 is an elevation view illustrating a fragment of a truck frame supported from an axle housing by my improved springing system, Figure 3 is a plan view showing the springs assembled in one way at both ends of an axle housing, and Figure 4 is a plan view of a truck illustrating the spring assembly, in reverse arrangement, in conjunction with two axles.

More particularly, I indicates a structural member of a rail truck which may be the main side frame and which has two stiff shaft members 2 and 3 depending therefrom. Concentric with the members 2 and 3 are stepped spring seats 4 and 5, respectively, which locate the springs 6 and 7.

One of the springs, as illustrated, resides fore and the other aft of the truck axle 8. The axle has a journal bearing 9 which supports the spring saddle 10 having a spring pot 11 for the spring 6 and a spring pot 12 for the spring 7. It is recommended that the spring 6 be placed fore of the axle at one end thereof and aft at the opposite end thereof and that the arrangement of the other axle be reversed as illustrated in Figure 4, although both springs 6 may reside on the same side of the axle as illustrated in Figure 3, if desired.

The spring 7 is a steel coil of substantially constant pitch and, hence, has a substantially constant load-deflection ratio. It has greater free height than the spring 6 and carries the major portion of the empty, static loading of the car body supported by the truck. This spring is relatively unstable against distortion by horizontal forces and if the spring 6 were similarly constructed the usual pedestal arrangement with guides would be used instead of the spring saddle as shown. The spring 6 supports a minor portion of the empty static loading of the car body thereabove, but it supports an increasingly greater proportion of the weight with increased static and dynamic loading. The coils of this spring 6 have a pitch which increases from one end thereof toward the other, as illustrated or in any other way so that the spacing between some coils is greater than the spacing between other coils and so that the coils with less spacing will bottom progressively with increased deflection. It has a load deflection ratio which increases with increased vertical loading. There are two requirements, in the preferred form, as to the manner in which this ratio increases; first, it should increase to the extent that the load deflection ratio of both springs is made to increase under increased loading, and secondly, the load deflection ratio of both springs should increase, within limits of minimum and maximum loading, approximately proportional to the square of the deflection of the supported body. This spring 6 having a greater load deflection ratio than spring 7, less coils, less free height and a thicker cross-section, has very substantial resistance to deflection by horizontal forces usually experienced in service and obviates the necessity for the usual guided pedestals to resist them. For unusual or accidental horizontal forces as those resulting for instance from slight collisions, spring seat 4 can be extended downward within the spring so as to limit the horizontal displacement by direct contact with coils near the base of the spring. The elongated seat 4 may have a length equal to anything less than the height of the spring 6 when the spring is completely collapsed.

What I claim is:

1. The combination of a vehicle body and a plurality of sets of springs at spaced points beneath said body for the support thereof, each of said sets comprising two coil springs one of which has a uniform pitch of the coils, the other of which has coils of variable pitch, said springs acting jointly to resist all vertical movements of the supported body, and together having a load deflection ratio which increases substantially proportionally to the square of the deflection of the supported body.

2. The combination of a vehicle body and a plurality of sets of springs at spaced points beneath said body for the support thereof, each of the sets comprising two coil springs one of which has a uniform pitch of the coils, the other of which has coils of variable pitch, said springs acting jointly to resist all vertical movements of the supported body the spring of uniform pitch having a length and strength such that it supports the major portion of the empty static loading of said body, the spring of variable pitch having a length and strength such that it supports the major portion of the additional load when said body is fully loaded and under strenuous dynamic conditions.

3. In a rail truck, axles each having a journal bearing at each end thereof, and a set of springs supporting the frame of the truck from said journal bearings comprising two coil springs, one of said springs having a constant pitch, the other of said springs having a variable pitch, one of said springs being fore and the other spring aft of said journal bearing, said springs constituting the sole means for resisting all normal vertical and horizontal forces between said truck frame and said journal bearings.

4. In a rail truck, axles each having a journal bearing at each end thereof, and a set of springs supporting the frame of the truck from said journal bearings comprising two coil springs, one of said springs having a constant pitch, the other of said springs having a variable pitch, one of said springs being fore and the other spring aft of said journal bearing, said springs constituting the sole means for resisting all normal vertical and horizontal forces between said truck frame and said journal bearings, and a rigid member projecting into at least one of said springs, said rigid member having clearance with its spring during normal operation and being adapted for contact thereby under abnormal horizontal forces.

5. In a rail truck, axles each having a journal bearing at each end thereof, and a set of springs supporting the frame of the truck from said journal bearings comprising two coil springs, one of said springs having a constant pitch, the other of said springs having a variable pitch, one of said springs being fore and the other spring aft of said journal bearing, the spring with constant pitch having a lower load deflection ratio than the lowest ratio of the other spring, the spring with variable pitch having greater resistance to distortion by lateral forces when deflected through the spring with constant pitch, said springs together resisting all relative vertical and horizontal movements between said frame and said journal springs.

6. In a rail truck, axles each having a journal bearing at each end thereof, and a set of springs supporting the frame of the truck from said journal bearings comprising two coil springs, one of said springs having a constant pitch, the other of said springs having a variable pitch, one of said springs being fore and the other spring aft of said journal bearing, said springs constituting the sole means for resisting all normal vertical and horizontal forces between said truck frame and said journal bearings, and a rigid guard member projecting into at least one of said springs from one of the seats thereof for a distance slightly less than the collapsed height of said spring, said guard member having sufficient clearance with its spring to be free of contact therewith during normal operation and sufficiently close thereto for contact thereby under abnormal horizontal forces.

7. In a rail truck, journal bearings and a frame, sets of springs at each of said bearings supporting said frame therefrom, said sets each being composed of two springs one of which is located fore and the other aft of said journal bearing, one spring of each set being of constant pitch angle, the other spring of each set having a variable pitch angle.

8. In a rail truck, journal bearings and a frame, sets of springs at each of said bearings supporting said frame therefrom, said sets each being composed of two metallic coil springs one of which is located fore and the other aft of said journal bearing, the springs of each of said sets having substantially the same diameter, one spring having a constantly changing deflection ratio under vertical loading, the other spring in the same set having a substantially constant load deflection ratio.

EMIL H. PIRON.